United States Patent
Gossweiler (10) Patent No.: US 7,082,944 B2
(45) Date of Patent: Aug. 1, 2006

(54) CHANGEOVER VALVE AND DUAL AIR SUPPLY BREATHING APPARATUS

(75) Inventor: Otto Gossweiler, Effretikon (CH)

(73) Assignee: TVI Corporation, Glenn Dale, MD (US)

( * ) Notice: Subject to any disclaimer, the term of this patent is extended or adjusted under 35 U.S.C. 154(b) by 0 days.

(21) Appl. No.: 10/658,458

(22) Filed: Sep. 10, 2003

(65) Prior Publication Data

US 2005/0051169 A1    Mar. 10, 2005

(51) Int. Cl.
  *A62B 9/00*    (2006.01)
  *A62B 9/02*    (2006.01)
  *F16K 1/00*    (2006.01)

(52) U.S. Cl. ............................. 128/205.24; 128/205.22; 128/204.29; 128/204.27; 137/875

(58) Field of Classification Search ........... 128/205.24, 128/204.26, 204.18, 204.21, 205.22, 204.22, 128/204.27, 204.29, 200.24; 137/875
See application file for complete search history.

(56) References Cited

U.S. PATENT DOCUMENTS

| 5,746,199 | A | * | 5/1998 | Bayron et al. | .......... 128/205.24 |
| 5,899,805 | A | * | 5/1999 | Dowd et al. | .................. 454/76 |
| 5,931,163 | A | * | 8/1999 | Stegmann et al. | ..... 128/204.26 |
| 6,029,444 | A | * | 2/2000 | Nakamura et al. | ............ 60/324 |
| 6,182,699 | B1 | * | 2/2001 | Hawkes | ....................... 137/875 |
| 6,269,839 | B1 | * | 8/2001 | Wickham et al. | ....... 137/625.65 |
| 6,357,463 | B1 | * | 3/2002 | Wickham et al. | .............. 137/12 |
| 6,443,154 | B1 | * | 9/2002 | Jalde et al. | ............ 128/205.29 |
| 6,644,352 | B1 | * | 11/2003 | Pfetzer | ........................ 137/875 |
| 6,745,770 | B1 | * | 6/2004 | McAuliffe et al. | ..... 128/205.24 |
| 6,895,964 | B1 | * | 5/2005 | McAuliffe et al. | ..... 128/205.24 |
| 6,938,586 | B1 | * | 9/2005 | Manners et al. | ........... 123/41.1 |
| 6,955,188 | B1 | * | 10/2005 | Heckt | .......................... 137/875 |
| 2001/0047834 | A1 | * | 12/2001 | Menin et al. | ................ 137/875 |

* cited by examiner

*Primary Examiner*—Henry Bennett
*Assistant Examiner*—Nihir Patel
(74) *Attorney, Agent, or Firm*—R. Christopher Rueppell; Gregory M. Stone; Jeffrey C. Maynard (57) ABSTRACT

A dual air supply breathing apparatus that allows a user to quickly and easily switch between two or more sources of air or compressed gas, such as filtered air from a Powered Air Purifying Respirator (PAPR) and compressed air from a Self-Contained Breathing Apparatus (SCBA). In one variation, the dual air supply breathing apparatus uses a Y-shaped changeover valve with two input tubes and one output tube. The first input tube receives filtered air from a PAPR and the second input tube receives compressed air from a tank. An actuator controls a flap valve within the changeover valve to seal off one of the input tubes while creating a flow path between the other input tube and the output tube. The changeover valve may be controlled by manipulating the high-pressure valve on the tank of compressed gas and/or by manipulating the switch that activates the PAPR.

31 Claims, 5 Drawing Sheets

CHANGEOVER VALVE AND DUAL AIR SUPPLY BREATHING APPARATUS

BACKGROUND OF THE INVENTION

1. Field of the Invention

The present invention relates to a breathing apparatus, and more particularly to a changeover valve that allows a user of a breathing apparatus to switch between sources of air or other gas.

2. Description of Related Art

Firefighters, military or emergency response personnel, or others may be required to work in an environment containing harmful and possibly fatal air-born toxins or other material. Respiratory hazards may include harmful gases, vapors, or particulate matter. To reduce the inhalation of harmful material, workers in such an environment may use a breathing apparatus.

One type of breathing apparatus, known as a Powered Air Purifying Respirator (PAPR), is a fan-forced positive pressure breathing apparatus. Such an apparatus may include a gas mask, a filtering element to filter potentially contaminated air, and a fan or blowing element. The fan or blowing element continually supplies filtered air to the gas mask. The filtered air replenishes the internal confines of the mask and is continually ejected.

PAPRs are typically useful in environments where the ambient air is relatively oxygen-rich and where filtering elements are effective in removing all contaminants. However, such a breathing apparatus may not be suited to environments where the ambient air is oxygen-poor or contains contaminants that cannot be filtered out. Furthermore, the filtering element becomes full of contaminants over time and must be replaced. A worker may risk exposure to hazardous or toxic materials by changing the filtering element while working in a hazardous environment.

Another type of breathing apparatus, known as a Self-Contained Breathing Apparatus (SCBA), uses a supply of air or other gas, such as a tank of compressed air. Such an apparatus may also include a gas mask and a regulator. The regulator controls the delivery of gas from the supply to the gas mask.

SCBAs are typically useful in environments where the ambient air is oxygen-poor or when there is a risk that filtering may not remove all possible contaminants. However, the source of air or other gas becomes exhausted over time and must be replaced. For this reason, it may be advantageous to use filtered air when possible. Furthermore, when the source of air or other gas becomes exhausted, a worker may risk exposure to hazardous or toxic materials by changing the source of air or other gas while working in a hazardous environment.

Furthermore, in some situations, the type of environmental contaminants may not be known in advance or may change quickly. In such a situation, a worker may be ill-equipped for a particular environment, or may risk exposure by switching from one type of breathing apparatus to another.

There is a need for a breathing apparatus that allows a worker to perform maintenance on the apparatus, such as changing a filter or replacing a source of air or other gas, while minimizing the risk of contamination. There is a further need for a system that allows a worker to quickly select an air or gas supply that is appropriate to the environment.

SUMMARY OF THE INVENTION

Aspects of the present invention provide a dual air supply breathing apparatus that allows a worker to quickly and easily switch between two or more sources of air or compressed gas, such as filtered air from a PAPR and compressed air from an SCBA.

One aspect of the present invention relates to a changeover valve for use in delivering a gas to a gas mask. The changeover valve includes a first valve inlet tube defining and enclosing a first valve inlet cavity and a second valve inlet tube defining and enclosing a second valve inlet cavity. The changeover valve also includes a valve outlet tube defining and enclosing an outlet cavity, the valve outlet tube communicating with the first valve inlet tube and the second valve inlet tube. The changeover valve further includes a flap valve actuatable between a first position and a second position, and an actuator for actuating the flap valve between the first position and the second position. The second valve inlet cavity and the outlet cavity define a first flow path when the flap valve is in the first position, and the first valve inlet cavity and the outlet cavity define a second flow path when the flap is in the second position.

In another aspect of the present invention, an air supply changeover apparatus for use in delivering a gas to a gas mask includes a first valve inlet tube defining and enclosing a first valve inlet cavity, and a second valve inlet tube defining and enclosing a second valve inlet cavity. The air supply changeover apparatus also includes a valve outlet tube defining and enclosing an outlet cavity, the valve outlet tube communicating with the first valve inlet tube and the second valve inlet tube, a flap valve actuatable between a first position and a second position, and an actuator for actuating the flap valve between the first position and the second position. The air supply changeover apparatus further includes an SCBA inlet configured to receive gas from a gas supply source and a breathing regulator communicating with the SCBA inlet and to the second valve inlet tube, to receive gas from the SCBA inlet and control the delivery of gas into the second valve inlet cavity. The air supply changeover apparatus also includes a filter to filter potentially harmful contaminants from ambient air and an air blower to draw ambient air into the filter and to blow filtered air into the first valve inlet cavity. The apparatus still further includes a breathing air outlet communicating with the valve outlet tube, to output either gas from the breathing regulator or filtered air. The second valve inlet cavity and the outlet cavity define a first flow path when the flap valve is in the first position, and the first valve inlet cavity and the outlet cavity define a second flow path when the flap is in the second position.

In still an additional aspect of the invention, a dual air supply breathing apparatus for delivering breathable gas to a user includes a changeover valve. The changeover valve includes a first valve inlet tube defining and enclosing a first valve inlet cavity, a second valve inlet tube defining and enclosing a second valve inlet cavity, and a valve outlet tube defining and enclosing an outlet cavity, the valve outlet tube communicating with the first valve inlet tube and the second valve inlet tube. The changeover valve also includes a flap valve actuatable between a first position and a second position, and an actuator for actuating the flap valve between the first position and the second position. The second valve inlet cavity and the outlet cavity define a first flow path when the flap valve is in the first position, and the first valve inlet cavity and the outlet cavity define a second flow path when the flap is in the second position. The dual air supply breathing apparatus for delivering breathable gas to a user also includes a tank containing a supply of a compressed gas, a high-pressure valve to control the flow of gas out of the tank, an SCBA inlet configured to receive gas from the tank, and a breathing regulator communicating with the SCBA inlet and to the second valve inlet tube, to receive gas from the SCBA inlet and control the delivery of gas into the second valve inlet cavity. The dual air supply breathing apparatus further includes a filter to filter potentially harmful contaminants from ambient air, and an air blower to draw ambient air into the filter and to blow filtered air into the first valve inlet cavity. The dual air supply breathing apparatus also includes a breathing air outlet communicating with the valve outlet tube to output gas, and a gas mask to receive gas from the breathing air outlet and deliver gas to a user, the gas mask having an input port to receive gas.

Additional advantages and novel features of the present invention will become more apparent from the following description.

DETAILED DESCRIPTION OF THE PRESENT INVENTION

The present invention provides a changeover valve and dual air supply breathing apparatus which are illustrated in FIGS. 1–5. The present invention, as disclosed herein, allows a user to quickly and easily switch between two or more sources of air or compressed gas, such as filtered air from a PAPR and compressed air or other gas from an SCBA. This permits a user to select a source of air that is appropriate for a particular environment, and also allows a user access to a source of air or other gas while performing maintenance on the equipment, such as replacing a filter, a battery, or a tank.

Figure 1:
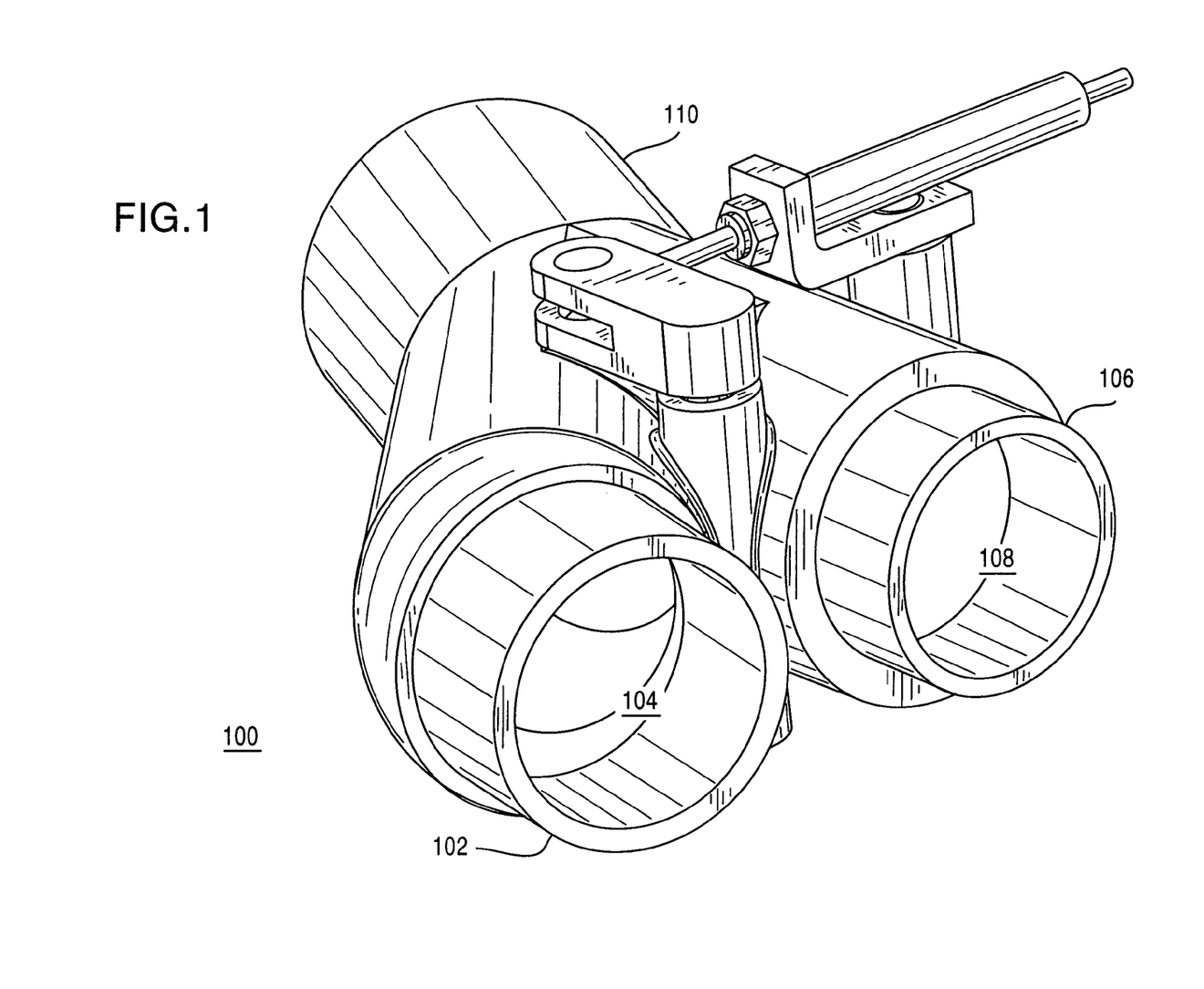
FIG. 1 is a perspective view of a changeover valve for a dual air supply breathing apparatus in accordance with one aspect of the present invention.

In particular, FIG. 1 illustrates an embodiment of a changeover valve 100 of the present invention. The changeover valve 100 includes a first valve inlet tube 102 defining and enclosing a first valve inlet cavity 104, and a second valve inlet tube 106 defining and enclosing a second valve inlet cavity 108. The changeover valve further includes a valve outlet tube 110 defining and enclosing an outlet cavity (shown in FIG. 2). The first valve inlet tube 102, the second valve inlet tube 106, and the valve outlet tube 110 may be connected, for example, in a Y-shaped configuration. The first valve inlet tube 102, the second valve inlet tube 106, and the valve outlet tube 110 may be rigid or flexible, and may be formed of any suitable material such as, for example, cast or welded metal, plastic, polyvinyl chloride (PVC), nylon, and the like.

Figure 2:
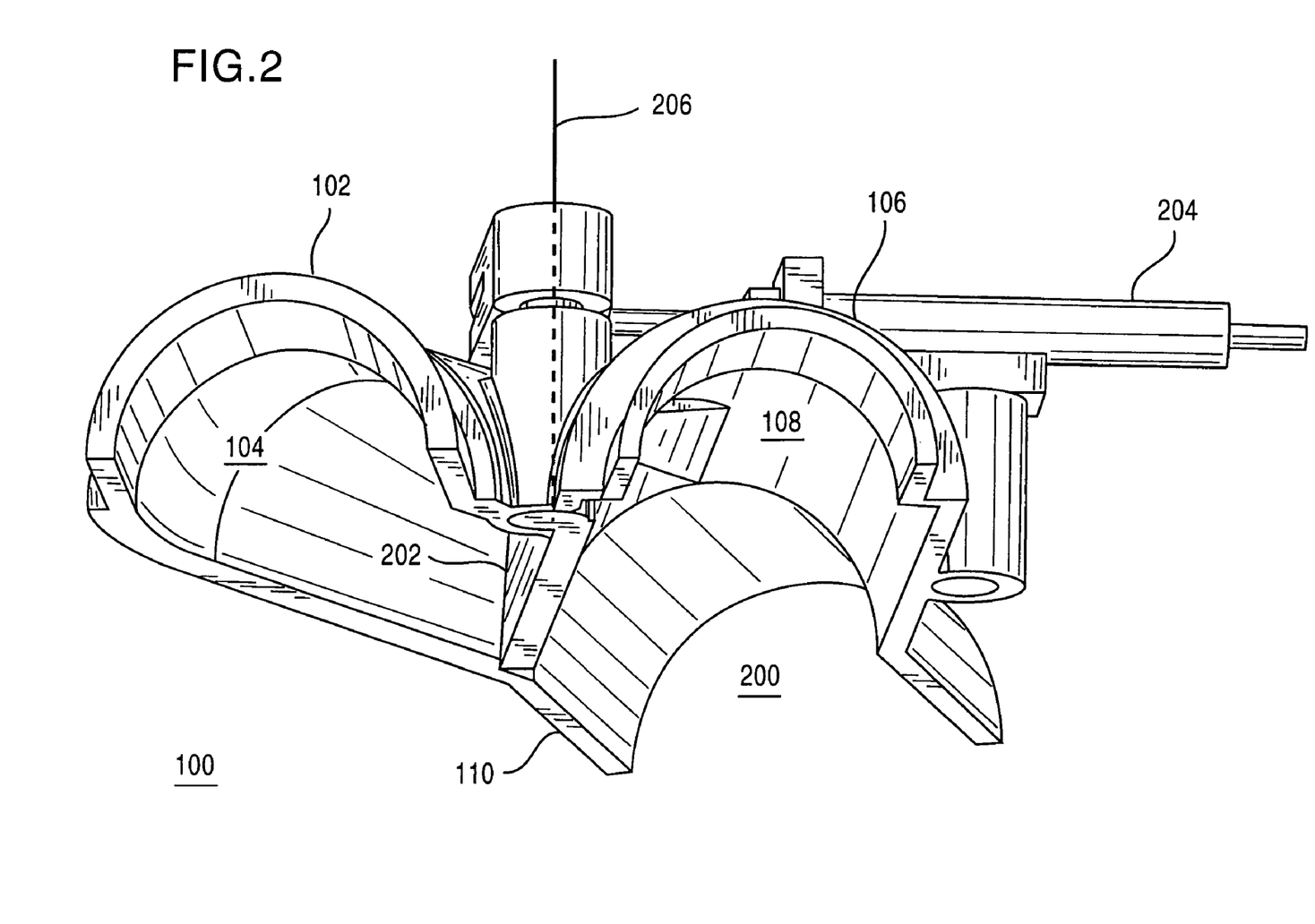
FIG. 2 is a cut view of a changeover valve for a dual air supply breathing apparatus in accordance with one aspect of the present invention.
Figure 3:
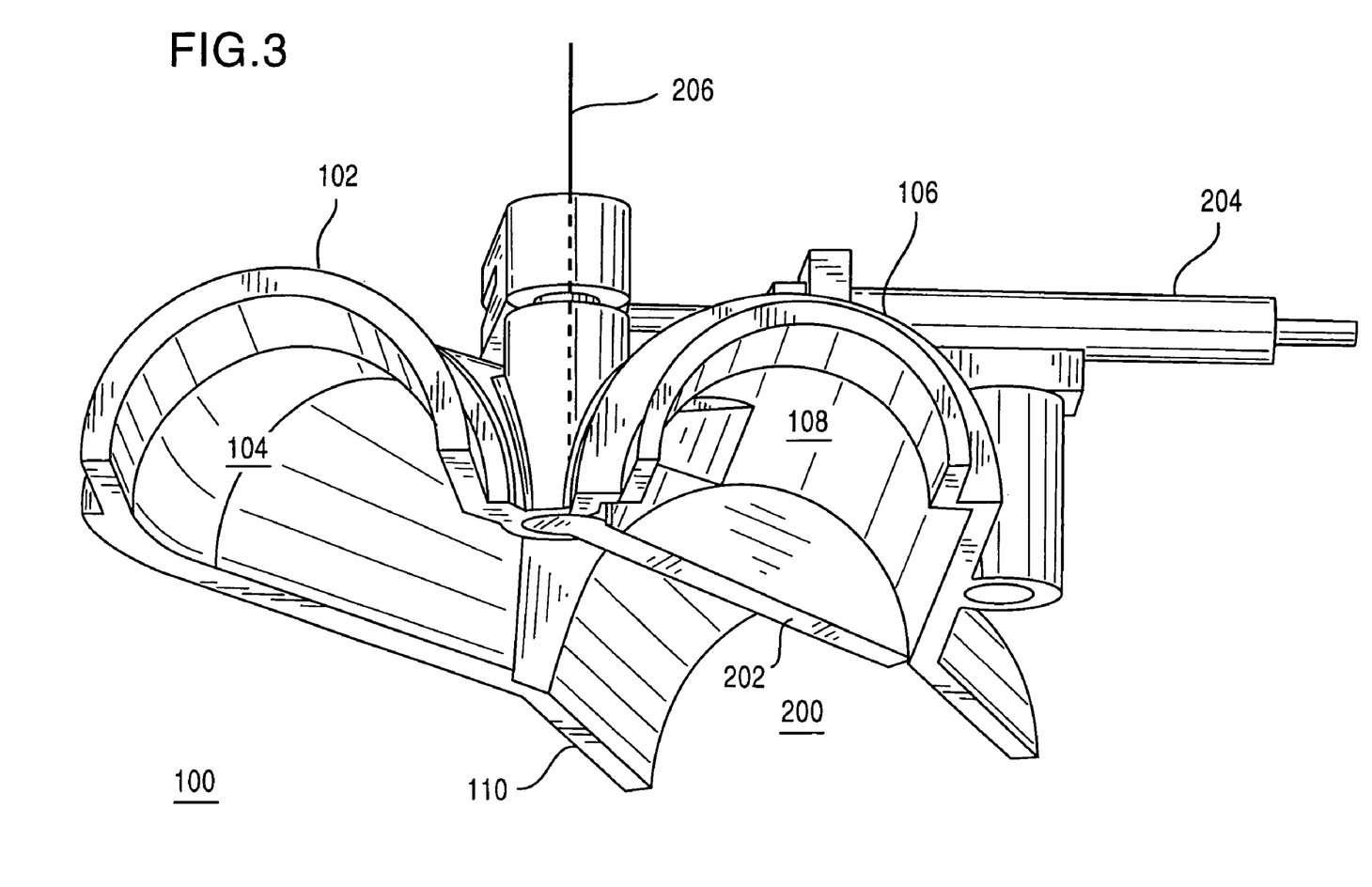
FIG. 3 is a cut view of a changeover valve for a dual air supply breathing apparatus in accordance with one aspect of the present invention.

FIG. 2 illustrates a cut view of the changeover valve 100. As shown in FIG. 2, the valve outlet tube 110 defines and encloses an outlet cavity 200. The changeover valve 100 further includes a flap valve 202 and an actuator 204 for controlling the movement of the flap valve 202. The actuator 204 may actuate the flap valve 202, for example, by rotating the flap valve 202 about an axis 206, or by causing actuation in another manner known in the art. When in a first position (shown in FIG. 2), the flap valve 202 forms an airtight seal between the first valve inlet cavity 104 and the outlet cavity 200, while allowing gas to flow between the second valve inlet cavity 108 and the outlet cavity 200. Referring now to FIG. 3, the flap valve 202 is shown in a second position. When in the second position (shown in FIG. 3), the flap valve 202 forms an airtight seal between the second valve inlet cavity 108 and the outlet cavity 200, while allowing gas to flow between the first valve inlet cavity 104 and the outlet cavity 200.

The actuator 204 is capable of actuating the flap valve 202 between the first position (shown in FIG. 2) and the second position (shown in FIG. 3), for example, by rotating the flap valve 202 about the axis 206. The actuator 204 may be controlled mechanically, electrically, pneumatically, magnetically, or via another mechanism known in the art. The operation of the actuator will be further described in detail with reference to FIG. 5.

Figure 4:
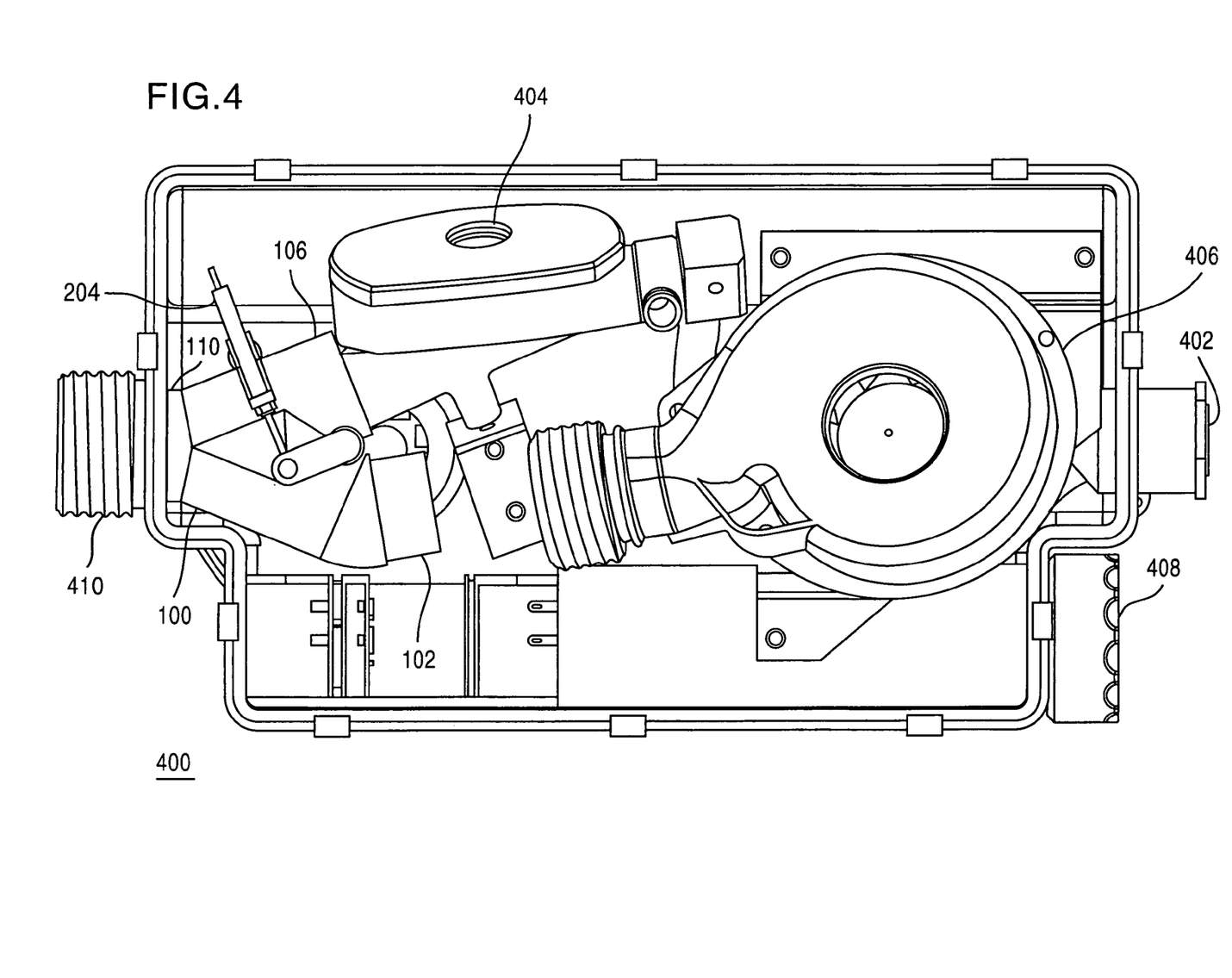
FIG. 4 illustrates an air supply changeover apparatus in accordance with one aspect of the present invention.

FIG. 4 illustrates an air supply changeover apparatus 400 in accordance with one aspect of the present invention. The air supply changeover apparatus 400 includes an SCBA inlet 402, also interchangeably referred to as a fluid inlet. The SCBA inlet 402 is configured to receive gas from a gas supply source, such as a tank of compressed air or other gas. The SCBA inlet 402 may, in some embodiments, include an adapter configured to connect to a tank of compressed air or other gas, such as via tubing.

The air supply changeover apparatus 400 also includes a breathing regulator 404 which communicates with the SCBA inlet 402 and to the second valve inlet tube 106 of the changeover valve 100. When activated, the breathing regulator 404 receives compressed air or other gas from the SCBA inlet 402 and controls the delivery of gas. When activated, the breathing regulator may reduce the pressure of the received compressed gas, and may output the gas at substantially atmospheric pressure. In one embodiment, as described further below, the breathing regulator 404 is configured to output gas into the second valve inlet tube 106 of the changeover valve 100.

Figure 5:
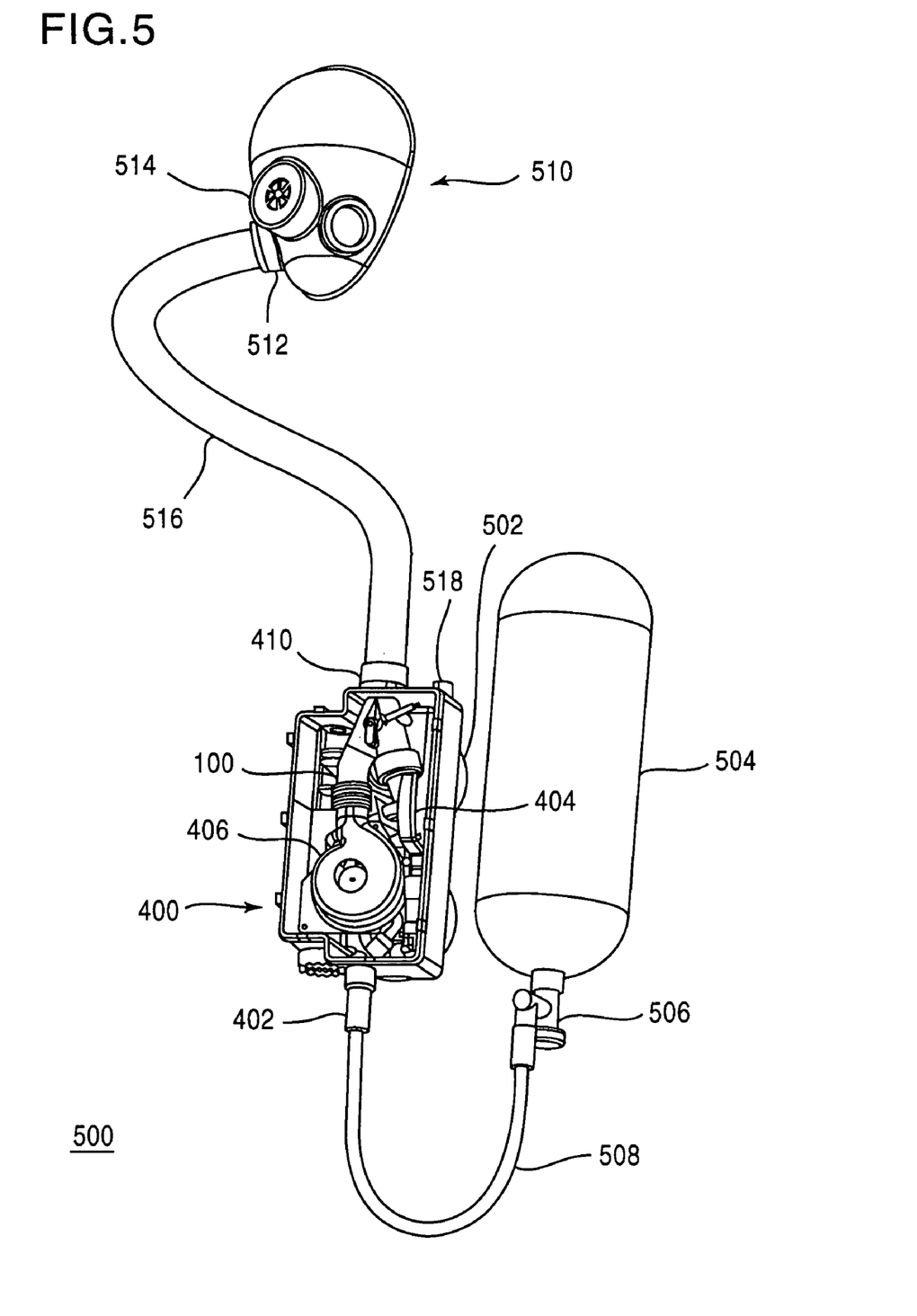
FIG. 5 illustrates a dual air supply breathing apparatus in accordance with one aspect of the present invention.

In one embodiment, the air supply changeover apparatus 400 further includes a filter 502, as shown in FIG. 5, to filter potentially harmful contaminants from ambient air. The air supply changeover apparatus 400 of an embodiment of the present invention also includes an air blower 406. The air blower 406 may be, for example, an electrically driven air blower including a fan. In this case, the air supply changeover apparatus 400 includes a battery 408 to supply power to the air blower 406. The air blower 406, when activated, continually draws ambient air into the filter 502 and supplies filtered air to the first valve inlet tube 102.

The changeover valve 100 functions to allow the flow of either the compressed air or other gas from the SCBA inlet 402, or the filtered air from the filter and air blower 406. If the flap valve 202 is in a first position as shown in FIG. 2, an airtight seal is formed between the first valve inlet tube 102 and the valve outlet tube 110, while gas is able to flow between the second valve inlet tube 106 and the valve outlet tube 110. In this case, compressed air or other gas will flow from the breathing regulator 404, through the second valve inlet tube 106, and through the valve outlet tube 110.

If the flap valve 202 is in a second position, an airtight seal is formed between the second valve inlet cavity 108 and the outlet cavity 200, while gas is able to flow between the first valve inlet cavity 104 and the outlet cavity 200. In this case, the air blower 406 will draw ambient air through the filter and filtered air will flow through the first valve inlet cavity 104 and through the outlet cavity 200.

The air supply changeover apparatus 400 further includes a breathing air outlet 410 communicating with the valve outlet tube 110. The breathing air outlet 410 outputs air or other gas from the air supply changeover apparatus 400. The breathing air outlet 410 may, in some embodiments, include an adapter configured to connect to a gas mask or to connect to tubing.

FIG. 5 illustrates a dual air supply breathing apparatus 500 in accordance with one aspect of the present invention. The dual air supply breathing apparatus 500 includes the air supply changeover apparatus 400 of FIG. 4. The air supply changeover apparatus includes a filter 502 to filter contaminants from ambient air, a SCBA inlet 402, a changeover valve 100, and a breathing air outlet 410.

The dual air supply breathing apparatus 500 further includes, for example, a tank 504 containing compressed air or other gas that acts as a supply. The dual air supply breathing apparatus 500 also includes a high-pressure valve 506 for controlling the flow of air or other gas out of the tank 504, and further includes a high-pressure hose 508. The high-pressure hose 508 communicates with the tank 504 via the high-pressure valve 506, and also communicates with the air supply changeover apparatus 400 via the SCBA inlet 402. The high-pressure hose 508 conveys compressed air or other gas from the tank 504 to the air supply changeover apparatus 400.

The dual air supply breathing apparatus 500 also includes a gas mask 510 to deliver air to a user. The gas mask 510 may be or include a face mask, headgear, or another apparatus that delivers breathing gas to a user. The gas mask 510 may have one or more apertures and an eye lens inserted into each aperture to permit the user to see out of the gas mask 510 when worn. The gas mask 510 further includes at least one air input port 512 to permit the intake of air into the interior of the gas mask 510, and an air exhaust port 514 to permit exhaust gas to be expelled from the interior of the gas mask 510.

The dual air supply breathing apparatus 500 further includes a breathing air hose 516 that communicates with the breathing air outlet 410 of the air supply changeover apparatus 400, and also communicates with the input port 512 of the gas mask. The breathing air hose 516 allows communication of air or other gas between the air supply changeover apparatus 400 and the gas mask 510.

A user of the dual air supply breathing apparatus 500 may either select SCBA mode, wherein the air or other gas from the tank 504 is supplied to the gas mask 510, or select PAPR mode, wherein filtered ambient air is supplied to the gas mask 510. The user selects SCBA mode by opening the high-pressure valve 506 on the tank 504, and deactivates SCBA mode by closing the high-pressure valve 506 on the tank 504. The user selects PAPR mode by engaging an air blower switch 518 to activate the air blower 406, and deactivates PAPR mode by disengaging the air blower switch 518 to deactivate the air blower 406.

In one implementation, the actuator 204 controlling the flap valve 202 as shown in FIGS. 2 and 3, is pneumatic. For example, the actuator 204 may be a pneumatic actuating cylinder. In this implementation, a user may select SCBA mode by opening the high-pressure valve 506 on the tank 504, as shown in FIG. 5. This selection allows compressed air to enter both the breathing regulator 404 and the actuator 204. The actuator 204 then moves the flap valve 202 into a first position, allowing communication between the breathing regulator 404 and the gas mask 510.

The breathing regulator 404 may include a valve membrane, which in a closed position, inhibits the flow of air or other gas through the regulator 404. As the user inhales, a partial vacuum is created. The partial vacuum in turn draws the valve membrane within the breathing regulator 404 into an open position, wherein air or other gas can flow through the breathing regulator 404. This allows communication between the tank 504 and the gas mask 510.

In this implementation, a user may select PAPR mode by closing the high-pressure valve 506 on the tank 504, if it is open, and by switching on the air blower 406 by engaging the air blower switch 518. After a user switches from SCBA mode to PAPR mode, some air or other gas may remain in the high-pressure hose 508. However, as the user continues to breathe, some of the trapped air or other gas in the high-pressure hose 508 will be used. Furthermore, the actuator 204 may also include a bleed valve for optionally bleeding off some of the air or other gas inside the high-pressure hose 508.

In this implementation, the actuator 204 includes a spring or other mechanism to bias the flap valve to the second position. Absent the pneumatic force supplied to the actuator 204, the spring force of the spring is sufficient to move the flap valve 202 into a second position. Thus, when the high-pressure valve 506 is closed, the actuator 204 moves the flap valve 202 into the second position, allowing communication between the filter 502 and the gas mask 510 via the air blower 406.

In a second implementation, the actuator 204 controlling the flap valve 202 is electrically operated. The actuator 204 may draw power from the battery 408 for operation.

In this second implementation, a user may select SCBA mode by opening the high-pressure valve 506 on the tank 504 and by switching off the air blower 406 by disengaging the air blower switch 518. The actuator 204 then moves the flap valve 202 into the first position, allowing communication between the breathing regulator 404 and the gas mask 510.

The breathing regulator 404 may include a valve membrane, which in a closed position, inhibits the flow of air or other gas through the regulator 404. As the user inhales, a partial vacuum is created. The partial vacuum in turn draws the valve membrane within the breathing regulator 404 into an open position, wherein air or other gas can flow through the breathing regulator 404. This allows communication between the tank 504 and the gas mask 510.

In this second implementation, a user may select PAPR mode by closing the high-pressure valve 506 on the tank 504, if it is open, and by switching on the air blower 406 by engaging the air blower switch 518. After a user switches from SCBA mode to PAPR mode, some air or other gas may remain in the high-pressure hose 508. However, as the user continues to breathe, some of the trapped air or other gas in the high-pressure hose 508 will be used.

In this implementation, engaging the air blower switch 518 causes the actuator 204 to move flap valve 202 into a second position. Thus, when the high-pressure valve 506 is closed, the actuator 204 moves the flap valve 202 into a second position, creating a routing from the filter 502 to the gas mask 510 via the air blower 406.

In other implementations, the actuator 204 controlling the flap valve 202 may be operated mechanically, magnetically, or via another mechanism known in the art. If the actuator is operated manually, a user may manually control the movement of the flap valve 202, for example, using a lever or a mechanically operated switch. If the actuator is operated magnetically, it may include, for example, a magnetic solenoid to actuate the flap valve 202. Other implementations of the actuator 204 are also within the scope of the invention.

While there has been described what are at present considered to be preferred embodiments of the present invention, it will be understood that various modifications may be made thereto, and it is intended that the appended claims cover all such modifications as fall within the true spirit and scope of the invention. In particular, it is contemplated that the invention could be practiced with a variety of sources of air or other gas. The invention is not limited strictly to a dual SCBA and PAPR apparatus. Furthermore, while the invention has been described in conjunction with an apparatus for switching between two sources of gas, the number of sources may be increased. In addition, while the invention has been described in conjunction with an apparatus for switching between sources of breathable gas, other gases, liquids, or any other fluids may be used. Other modifications will be apparent to those skilled in the art.

What is claimed is:

1. A changeover valve for use in delivering a gas to a gas mask, the changeover valve comprising:
    a first valve inlet tube defining and enclosing a first valve inlet cavity;
    a second valve inlet tube defining and enclosing a second valve inlet cavity, the second valve inlet tube being separate and distinct from the first valve inlet tube;
    a valve outlet tube defining and enclosing an outlet cavity, the valve outlet tube communicating with the first valve inlet tube and the second valve inlet tube;
    a flap valve actuatable between a first position and a second position about an axis of rotation,
    wherein the second valve inlet cavity and the outlet cavity define a first flow path allowing a gas to flow between the second valve inlet cavity and the outlet cavity in a direction from the second valve inlet cavity toward the outlet cavity when the flap valve is in the first position,
    wherein the first valve inlet cavity and the outlet cavity define a second flow path allowing the gas to flow between the first valve inlet cavity and the outlet cavity in a direction from the first valve inlet cavity toward the outlet cavity when the flap valve is in the second position, and
    wherein the axis of rotation is located at a first end of the flap valve which is opposite a second end of the flap valve; and
    an actuator to actuate the flap valve between the first position and the second position, wherein the actuator is selected from a group consisting of a pneumatic actuator and a magnetic actuator.

2. The changeover valve of claim 1, wherein the first valve inlet tube, the second valve inlet tube, and the valve outlet tube are coupled in a Y-shaped configuration.

3. The changeover valve of claim 1, wherein the flap valve sealably closes an opening between the first valve inlet cavity and the outlet cavity when the flap valve is in the first position.

4. The changeover valve of claim 1, wherein the flap valve sealably closes an opening between the second valve inlet cavity and the outlet cavity when the flap valve is in the second position.

5. An air supply changeover apparatus for use in delivering a gas to a gas mask, the air supply changeover apparatus comprising:
    a first valve inlet tube defining and enclosing a first valve inlet cavity;
    a second valve inlet tube defining and enclosing a second valve inlet cavity;
    a valve outlet tube defining and enclosing an outlet cavity, the valve outlet tube communicating with the first valve inlet tube and the second valve inlet tube;
    a flap valve actuatable between a first position and a second position;
    a fluid inlet configured to receive gas from a gas supply source;
    a breathing regulator communicating with the fluid inlet and to the second valve inlet tube, to receive gas from the fluid inlet and control the delivery of gas into the second valve inlet cavity;
    a filter to filter contaminants from ambient air;
    an air blower to draw ambient air into the filter and to blow filtered air into the first valve inlet cavity; and
    a breathing air outlet communicating with the valve outlet tube, to output either gas from the breathing regulator or filtered air,
    wherein the second valve inlet cavity and the outlet cavity define a first flow path when the flap valve is in the first position, and the first valve inlet cavity and the outlet cavity define a second flow path when the flap is in the second position.

6. The air supply changeover apparatus of claim 5, further comprising a battery to supply power to the air blower.

7. The air supply changeover apparatus of claim 5, wherein the flap valve sealably closes an opening between the first valve inlet cavity and the outlet cavity when the flap valve is in the first position.

8. The air supply changeover apparatus of claim 5, wherein the flap valve sealably closes an opening between the second valve inlet cavity and the outlet cavity when the flap valve is in the second position.

9. The air supply changeover apparatus of claim 5, wherein the fluid inlet comprises an adapter configured to allow connection to a supply of gas.

10. The air supply changeover apparatus of claim 5, wherein the breathing regulator reduces the pressure of the gas received from the fluid inlet and outputs reduced pressure gas into the second valve inlet tube.

11. The air supply changeover apparatus of claim 5, wherein the air blower comprises a fan.

12. The air supply changeover apparatus of claim 5, wherein the breathing air outlet includes an adapter configured to allow connection to a gas mask.

13. The air supply changeover apparatus of claim 5, further comprising an actuator to actuate the flap valve between the first position and the second position.

14. A dual air supply breathing apparatus for delivering breathable gas to a user, the dual air supply breathing apparatus comprising:
    a changeover valve comprising:
        a first valve inlet tube defining and enclosing a first valve inlet cavity,
        a second valve inlet tube defining and enclosing a second valve inlet cavity,
        a valve outlet tube defining and enclosing an outlet cavity, the valve outlet tube communicating with the first valve inlet tube and the second valve inlet tube,
        a flap valve actuatable between a first position and a second position, and wherein the second valve inlet cavity and the outlet cavity define a first flow path when the flap valve is in the first position, and the first valve inlet cavity and the outlet cavity define a second flow path when the flap valve is in the second position;

a tank containing a supply of a compressed gas;

a high-pressure valve to control the flow of gas out of the tank, a fluid inlet configured to receive gas from the tank;

a breathing regulator communicating with the fluid inlet and to the second valve inlet tube, to receive gas from the fluid inlet and control the delivery of gas into the second valve inlet cavity;

a filter to filter contaminants from ambient air;

an air blower to draw ambient air into the filter and to blow filtered air into the first valve inlet cavity;

a breathing air outlet communicating with the valve outlet tube to output gas; and a gas mask to receive gas from the breathing air outlet and deliver gas to a user, the gas mask having an input port to receive gas.

15. The dual air supply breathing apparatus of claim 14, wherein the flap valve sealably closes an opening between the first valve inlet cavity and the outlet cavity when the flap valve is in the first position.

16. The dual air supply breathing apparatus of claim 14, wherein the flap valve sealably closes an opening between the second valve inlet cavity and the outlet cavity when the flap valve is in the second position.

17. The dual air supply breathing apparatus of claim 14, further comprising an actuator to actuate the flap valve between the first position and the second position.

18. The dual air supply breathing apparatus of claim 17, wherein the actuator is pneumatically operated.

19. The dual air supply breathing apparatus of claim 17, wherein the actuator comprises a biasing device for biasing the flap valve to the second position.

20. The air supply changeover apparatus of claim 19, wherein the biasing device includes a spring.

21. The dual air supply breathing apparatus of claim 18, wherein compressed gas from the tank is used to operate the actuator to actuate the flap valve into the first position.

22. The dual air supply breathing apparatus of claim 16, wherein the actuator is electrically operated.

23. The dual air supply breathing apparatus of claim 22, further comprising a battery to supply power to the actuator.

24. The dual air supply breathing apparatus of claim 23, wherein the battery also supplies power to the air blower.

25. The dual air supply breathing apparatus of claim 22, further comprising a switch.

26. The dual air supply breathing apparatus of claim 25, wherein engaging the switch causes the actuator to move the flap valve into a second position.

27. The dual air supply breathing apparatus of claim 26, wherein engaging the switch also activates the air blower.

28. The dual air supply breathing apparatus of claim 25, wherein disengaging the switch causes the actuator to move the flap valve into a first position.

29. The dual air supply breathing apparatus of claim 27, wherein disengaging the switch also deactivates the air blower.

30. The dual air supply breathing apparatus of claim 16, further comprising a high-pressure hose communicating with the tank via the high-pressure valve, and also communicating with the fluid inlet, to convey compressed gas from the tank to the fluid inlet.

31. The dual air supply breathing apparatus of claim 16, further comprising a breathing air hose communicating with the breathing air outlet and to the input port of the gas mask, to deliver gas from the breathing air outlet to the gas mask.

* * * * *